United States Patent [19]
Getman

[11] 3,892,503
[45] July 1, 1975

[54] APPARATUS AND METHOD FOR MULTIPLE MODE MOTOR

[75] Inventor: Ronald K. Getman, Hopkins, Minn.

[73] Assignee: Sperry Rand Corporation, Troy, Mich.

[22] Filed: Jan. 23, 1974

[21] Appl. No.: 435,831

[52] U.S. Cl. ............. 418/61 B; 418/209; 418/61 B
[51] Int. Cl. ........................... F01c 1/02; F03c 3/00
[58] Field of Search ................. 418/61 B; 91/411 A

[56] References Cited
UNITED STATES PATENTS

| | | | |
|---|---|---|---|
| 3,558,245 | 1/1971 | Bolduc | 418/61 B |
| 3,586,466 | 6/1971 | Erickson | 418/209 |
| 3,778,198 | 12/1973 | Giversen | 418/61 B |

Primary Examiner—John J. Vrablik
Attorney, Agent, or Firm—Dorsey, Marquart, Windhorst, West and Halladay

[57] ABSTRACT

A hydraulic motor, including an energy conversion unit with chambers therein, such motor having a plurality of distinct modes of operation which vary in speed and torque, depending on the relative number of active and passive energy conversion unit chambers. Given a constant rate of fluid flow, a high-torque, low-speed mode is obtained with all chambers active and none passive. A low-torque, high-speed mode is obtained with a minimum number of chambers active and the balance passive. An intermediate torque and speed mode is obtained with an intermediate number of chambers active and the balance passive. Means is disclosed for shifting the motor from one mode of operation to another distinct mode of operation by selectively activating certain chambers (active) and isolating the balance (passive) in various combinations.

9 Claims, 10 Drawing Figures

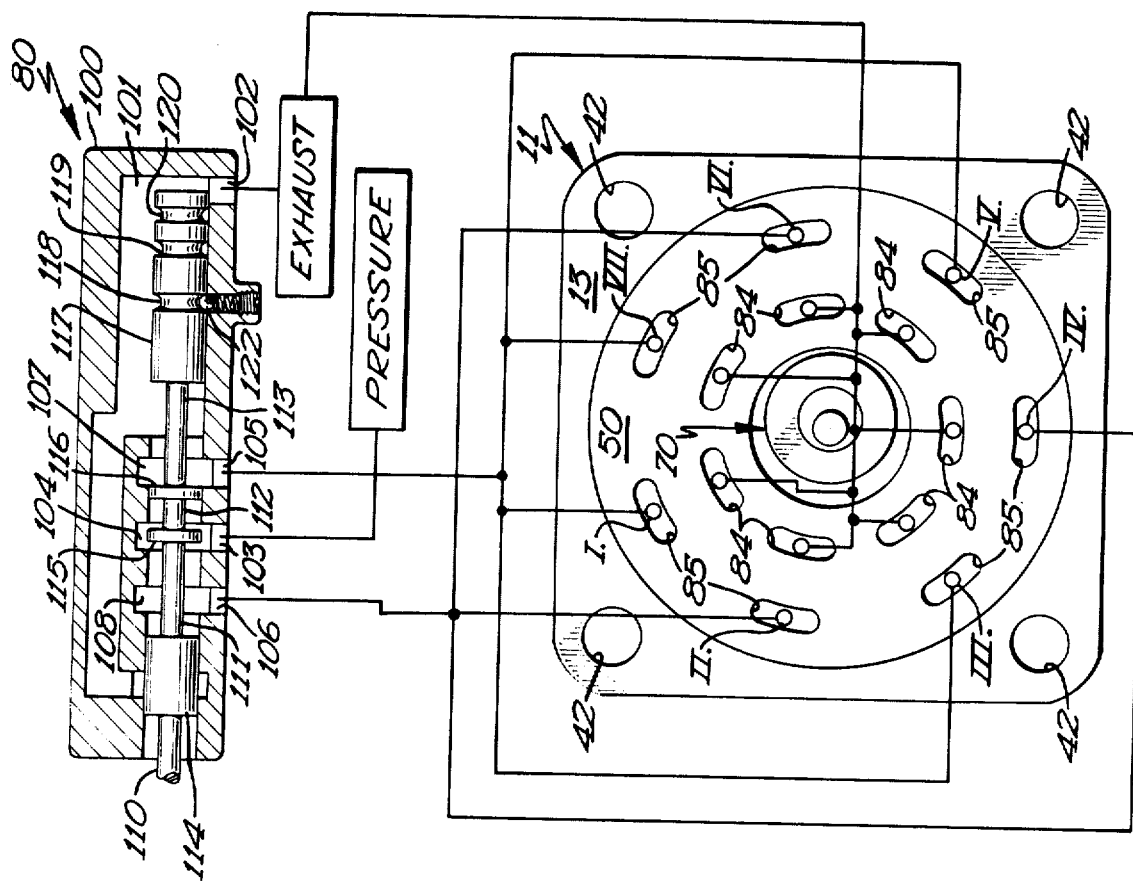

ic motors, Bolduc does not provide a means by which
APPARATUS AND METHOD FOR MULTIPLE MODE MOTOR

BACKGROUND OF THE INVENTION

The invention relates to the hydraulic motor art and, more particularly, to a hydraulic motor having an energy conversion unit of the Gerotor type which may be shifted nearly instantaneously from one mode of operation to another distinct mode of operation. When such motors are shifted from one mode to another, the corresponding change in speed and torque is inversely related. Thus, the possible distinct modes of operation of such hydraulic motors range between low-speed, high-torque and high-speed, low-torque.

The torque of a hydraulic motor can be varied, of course, by simply varying the input pressure of the hydraulic fluid. But varying the input pressure merely results in a gradual variation of the level of hydraulic energy input available for conversion to mechanical (or rotary) energy. This, in turn, leads to a gradual change in the mechanical energy output, or torque, of the hydraulic motor. However, it has not been found possible to provide a nearly instantaneous inverse change in torque, and, in turn, a shift from one mode of operation to another distinct mode of operation, by varying the input pressure of the hydraulic fluid, or by any other previously known means.

The Gerotor principle is, of course, well-known in the art of fluid motors, pumps, and metering devices. Gerotor units have frequently been employed as energy conversion units in a wide variety of hydraulic motors. In hydraulic motors having an energy conversion unit of the Gerotor type, conducting fluid pressure into the expanding Gerotor chambers and exhausting fluid pressure from the contracting Gerotor chambers obviously cannot be accomplished by utilizing valving means of the type characterized by fixed porting since the expanding and contracting Gerotor chambers are constantly revolving about a longitudinal axis. However, in the past, various means for valving fluid pressure, other than the type characterized by fixed porting, have been proposed.

Generally, valving for a hydraulic motor of the Gerotor type is accomplished by utilizing rotary or commutating valve spools such as Hudgens U.S. Pat. No. 3,289,602. Also, a single orbiting valve ring with a fluid conducting annulus is proposed in Carlson U.S. Pat. No. 3,316,814. However, both the rotary or commutating valve spools and the orbiting valve rings disclosed in the prior art simply do not provide for implementation of a nearly instantaneous shift of a hydraulic motor from one mode of operation to another distinct mode of operation. Furthermore, such valving means represent a source of fluid leakage, particularly at high fluid pressure. Thus, alternative means of valving Gerotor-type hydraulic motors have been sought.

More recently, Bolduc U.S. Pat. No. 3,588,245 discloses and claims a valving means having piston valves disposed for reciprocation on respective axes radial to the longitudinal axis of a hydraulic motor of the Gerotor type. The valving, as taught in the Bolduc patent, is accomplished by reciprocating pistons actuated in response to relative movement, either rotational or orbital, between the rotor and stator of a Gerotor unit. While this valving means substantially reduces the fluid leakage at high fluid pressure which is normally associated with prior art valving means for hydraulic motors of this type, Bolduc does not provide a means by which such motors can be shifted nearly instantaneously from one distinct mode of operation to another.

Finally, Richardson U.S. Pat. No. 3,594,105 relates to a reversible, variable speed hydraulic motor and teaches varying the speed of such motors by adjusting the alignment of a valving means positioned therein. However, when Richardson varies the speed of such motors, there is no corresponding inverse change in the torque, and, in turn, no shift from one mode of operation to another distinct mode of operation. Speed variation is simply obtained by dumping a portion of the hydraulic fluid rather than by passing all of the hydraulic fluid through a greater or lesser number of Gerotor chambers.

None of the aforementioned prior art patents teaches a hydraulic motor having an energy conversion unit, such as a Gerotor unit, in combination with a valving means in such a manner that the hydraulic motor is capable of providing two or more distinct modes of operation. Prior to the present invention, it has not been possible to provide a hydraulic motor which can be shifted nearly instantaneously to produce an inverse change in the speed and torque operating characteristics of such a motor. As a result, it has not been possible to provide a hydraulic motor capable of nearly instantaneously being changed from one mode of operation to another distinct mode of operation. Until the present invention, it simply has not been possible to provide a single hydraulic motor capable of a variety of applications and capable of quickly being adapted to such applications as the needs of the user vary.

SUMMARY OF THE INVENTION

With the present invention, depending upon which energy conversion unit chambers are pressurized and exhausted, and which are isolated, various distinct modes of operation for a hydraulic motor can be provided. The typical two modes are low-speed, high-torque, which involves use of all of such chambers, and high-speed, low-torque, which involves use of a minimum of such chambers and isolation of the balance. However, it will be understood that a variety of distinct intermediate modes between these two extremes can be provided by using an intermediate number of such chambers and isolating the balance. In addition, with the present invention, a hydraulic motor capable of being shifted nearly instantaneously from one mode of operation to another distinct mode of operation is provided.

The present invention is characterized by a valving means comprised of a series of reciprocating piston valves which correspond in number to the number of energy conversion unit chambers disposed about the longitudinal axis of a hydraulic motor. The piston valves may be disposed for reciprocation on respective axes radial to such longitudinal axis of such motor, or they may be disposed for reciprocation on respective axes spaced from and parallel to such longitudinal axis. The valving means is utilized to conduct fluid pressure to expanding chambers and exhaust fluid pressure from contracting and isolated chambers.

Camming means responsive to movement of the energy conversion unit is provided for reciprocating the pistons. Means for conducting fluid pressure to selected energy conversion unit chambers during expansion thereof, exhausting pressure from such chambers during contraction thereof and isolating the remaining chambers is also provided. Such means includes a plurality of independent fluid passages communicating with the valving means. Also, a selector means for selectively conducting fluid pressure to and exhausting fluid pressure from one or more of the plurality of independent fluid passages is provided. Finally, the selector means includes means for exhausting isolated energy conversion unit chambers during both expansion and contraction thereof.

The primary object of the present invention is to provide a hydraulic fluid motor capable of a variety of distinct modes of operation and capable of nearly instantaneously being shifted from one mode of operation to another distinct mode of operation. A more specific object of the present invention is to provide valving means to conduct and exhaust fluid pressure to selected energy conversion unit chambers and to exhaust fluid pressure from the balance of isolated chambers. An additional object of the present invention is to provide a plurality of independent fluid passages communicating with the valving means. A further object of the present invention is to provide selector means for selectively conducting and exhausting fluid pressure through one or more of such independent fluid passages. Other objects and advantages of the present invention will be set forth in more detail below.

BRIEF DESCRIPTION OF THE DRAWINGS

FIG. 9 is an axial section of the selector valve with the valve spool in a second mode position and an axial section of the Gerotor-type hydraulic motor taken on the line 5—5 of FIG. 1 showing a rear view of the piston valve block with a diagrammatic representation of pressure and exhaust lines running from the selector valve to the piston valve block;

FIG. 10 is an axial section of the selector valve with the valve spool in a third mode position and an axial section of the Gerotor-type hydraulic motor taken on the line 5—5 of FIG. 1 showing a rear view of the piston valve block with a diagrammatic representation of pressure and exhaust lines running from the selector valve to the piston valve block.

DESCRIPTION OF THE PREFERRED EMBODIMENT

The hydraulic motor utilized in the preferred embodiment of my invention is generally of the type disclosed in Bolduc U.S. Pat. No. 3,558,245. The hydraulic motor of my invention is characterized by a similar construction and operation. However, I provide a unique valving means having a plurality of independent fluid passages communicating therewith and a selector valve for selectively conducting and exhausting fluid pressure through such fluid passages, as distinguished from the common annular input and output fluid pressure grooves shown at 24c and 24e in the Bolduc patent.

Figure 1:
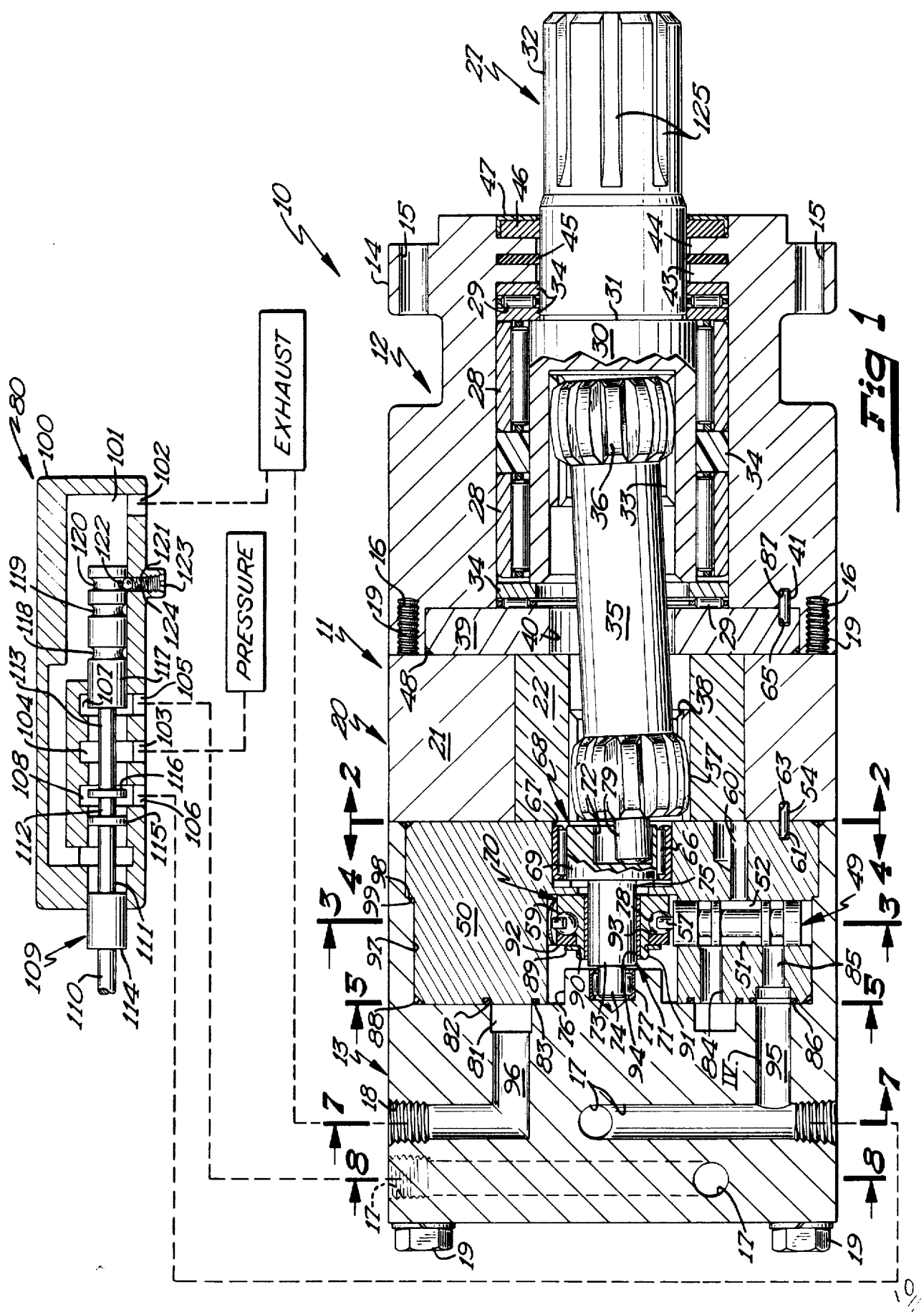
FIG. 1 is an axial section of a selector valve with the valve spool in a first mode position and an axial section of a hydraulic motor of the Gerotor type showing the relationship of the various elements including the relationship between the independent fluid passages, valving means and Gerotor unit.

The general nature of the preferred embodiment of my invention may be understood with reference to FIG. 1. The hydraulic motor 10 is of the Gerotor type and includes a housing 11 having a front housing block 12 and a rear housing block 13. The front housing block 12 is provided with mounting flange 14. Holes 15 are bored through mounting flange 14 so that hydraulic motor 10 can be suitably secured for operation in a conventional manner in proper relation to a device requiring power activation. Finally, the rear housing block 13 is characterized by pressure bores 17 and exhaust bore 18 which will be more particularly described below.

Figure 2:
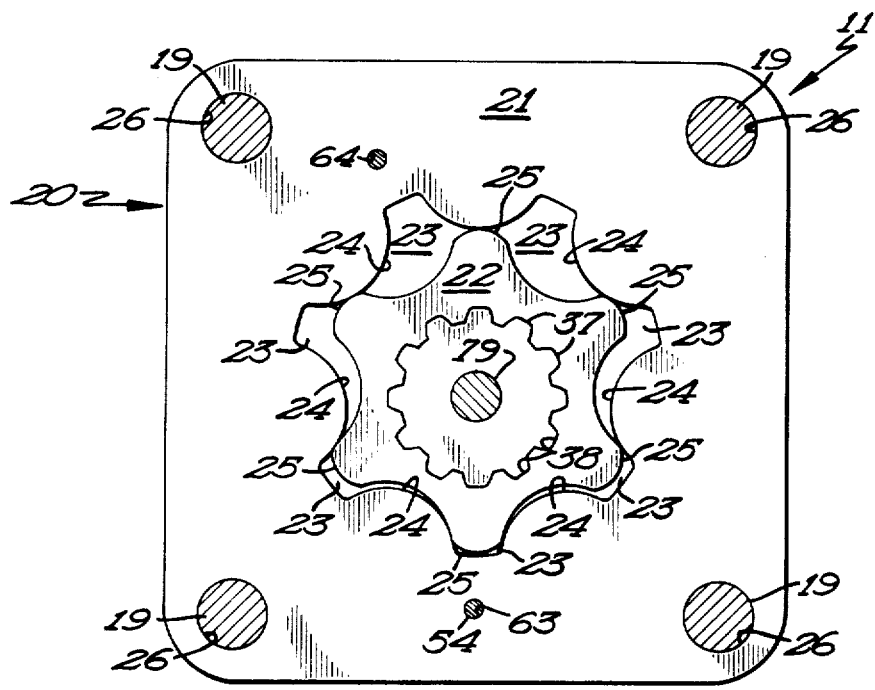
FIG. 2 is a sectional view of the Gerotor-type hydraulic motor taken on the line 2—2 of FIG. 1 showing the Gerotor unit in a rear view.

Bores 42, as shown in FIGS. 3 – 10, are provided in rear housing block 13 of hydraulic motor 10. Each bore 42 extends completely through the rear housing block 13 so that when the hydraulic motor 10 is placed in position to be assembled, such bores 42 align perfectly with corresponding bores 26 which are provided in the stator or outer ring 21 in a conventional Gerotor unit 20, as shown in FIG. 2. Finally, each bore 26 in the Gerotor unit 20 aligns perfectly with corresponding tapped and threaded holes 16 in front housing block 12.

Assembling the hydraulic motor 10, machine screws 19 firmly secure the rear housing block 13, Gerotor unit 20 and front housing block 12 in fixed relation. Bores 42 and bores 26 have a diameter sufficient to permit machine screws 19 of sufficient length to pass completely through rear housing block 13, Gerotor unit 20, and into tapped and threaded holes 16 in front housing block 12. In addition, tapped and threaded holes 16 have a sufficient diameter and thread size to cooperatively receive machine screws 19. By providing bores 42, bores 26, tapped and threaded holes 16 and machine screws 19 in this manner, all of the elements of the hydraulic motor 10 can be integrally held in fixed relation.

The conventional Gerotor unit 20, shown in FIGS. 1 and 2, includes an internally toothed outer ring or stator 21 and an externally toothed star or rotor 22. Rotor 22 is formed with one less external projection than the number of internal projections or lobes of stator 21 to define, in the conventional manner, a series of Gerotor chambers 23. In the embodiment shown in FIG. 2, the stator 21 is provided with seven internal projections or lobes 24 and the rotor 22 is provided with six external projections 25. Rotor 22 both orbits and rotates within stator 21 to thereby cause chambers 23 to expand and contract.

Referring once again to FIG. 1, an output shaft 27 is provided with interior casing portion 30 thereof having internal splines 33 and forming shoulder 31, and with exterior drive portion 32 thereof projecting from hydraulic motor 10 and having external splines 125. Interior casing portion 30 of output shaft 27 is mounted for rotation in a pair of needle roller bearings 28 and a pair of needle thrust bearings 29. Finally, a series of spacer rings 34 is provided. A spacer ring 34 is disposed between each of the needle thrust bearings 29 and the corresponding portion of interior casing portion 30 of output shaft 27 adjacent thereto, such spacer rings 34 being of suitable design and dimension so that they serve to space each of the needle thrust bearings 29 from its next adjacent needle roller bearing 28 as well. Thus, spacer rings 34 so provided maintain contact with shoulder 31 of interior casing portion 30 and the end of interior casing portion 30 directly opposite shoulder 31, and such spacer rings 34 are, in turn, in contact with needle thrust bearings 29. Therefore, interior casing portion 30 of output shaft 27 is mounted indirectly for rotation in needle thrust bearings 29. Also, a spacer ring 34 is disposed between the two needle roller bearings 28, such spacer ring 34 being of suitable design and dimension so that it serves to space needle roller bearings 28 from each other as well as serving to permit interior casing portion 30 of output shaft 27 to be directly in rolling engagement with such needle roller bearings 28.

Internally engaged with interior casing portion 30 of output shaft 27 and extending therefrom is short shaft 35 which is arcuately externally splined at each end. Short shaft 35 is commonly referred to in the art as the "dogbone," and it extends from interior casing portion 30 and to Gerotor unit 20, passing through a central aperture 40 in a wear plate 39 which is mounted between the former two elements. It should be noted that a pin 41 extends from aperture 65 in wear plate 39 into an appropriately positioned aperture 87 provided in front housing block 12 to confine wear plate 39 against movement.

Referring more particularly to FIG. 1, short shaft 35 is formed with arcuate external splines 36 at the end thereof internally engaged with interior casing portion 30. Arcuate external splines 36 mesh with internal splines 33 of interior casing portion 30 to provide a first portion of a drive means for output shaft 27. In addition, short shaft 35 is formed with arcuate external splines 37 at the end thereof internally engaged with Gerotor unit 20. Arcuate external splines 37 mesh with internal splines 38 of rotor 22 to provide a second portion of a drive means for output shaft 27. Accordingly, when rotor 22 rotates with respect to stator 21, internal splines 38 rotate. Also, since internal splines 38 mesh with arcuate external splines 37, the rotational movement is translated to short shaft 35 causing it to rotate. In addition, since arcuate external splines 36 of short shaft 35 mesh with internal splines 33 of output shaft 27, the output shaft 27 is caused to rotate. In this manner, a drive means for output shaft 27 is provided. However, it should be clear that only rotational movement of rotor 22 with respect to stator 21, not orbital movement, causes rotation of output shaft 27. The manner of transmitting rotational movement to rotor 22 of Gerotor unit 20 will be more fully understood below.

Making reference to front housing block 12, internal flanges 43 and 44 are provided. Located between flanges 43 and 44 is rubber O-ring 45. Also, immediately adjacent flange 43 is an additional spacer ring 34 which serves to space needle thrust bearing 29 and spacer ring 34 adjacent to shoulder 31 of interior casing portion 30 from contact therewith. In addition, immediately adjacent flange 44 is seal 46 retained in close engagement therewith by pressed fit lip 47. Thus, exterior drive portion 32 of output shaft 27 extends outwardly from hydraulic motor 10 through needle roller bearings 28, needle thrust bearings 29, spacer rings 34, flanges 43 and 44, rubber O-ring 45, seal 46 and pressed fit lip 47. Output shaft 27 is retained in position within hydraulic motor 10 by reason of flanges 43 and 44. When output shaft 27 is rotating within hydraulic motor 10 in engagement with a device requiring power activation, any longitudinal force transmitted thereto forces shoulder 31 thereof against spacer ring 34 next adjacent thereto. This, in turn, forces needle thrust bearing 29 against spacer ring 34 immediately adjacent flange 43. Flange 43 resists the force transmitted thereto and serves to retain output shaft 27 within hydraulic motor 10. Finally, front housing block 12 is characterized by a seal 48 which is disposed in an annular groove formed by a beveled edge on wear plate 39 and rests therein adjacent to the surfaces of stator 21 of Gerotor unit 20, wear plate 39 and front housing block 12.

Figure 3:
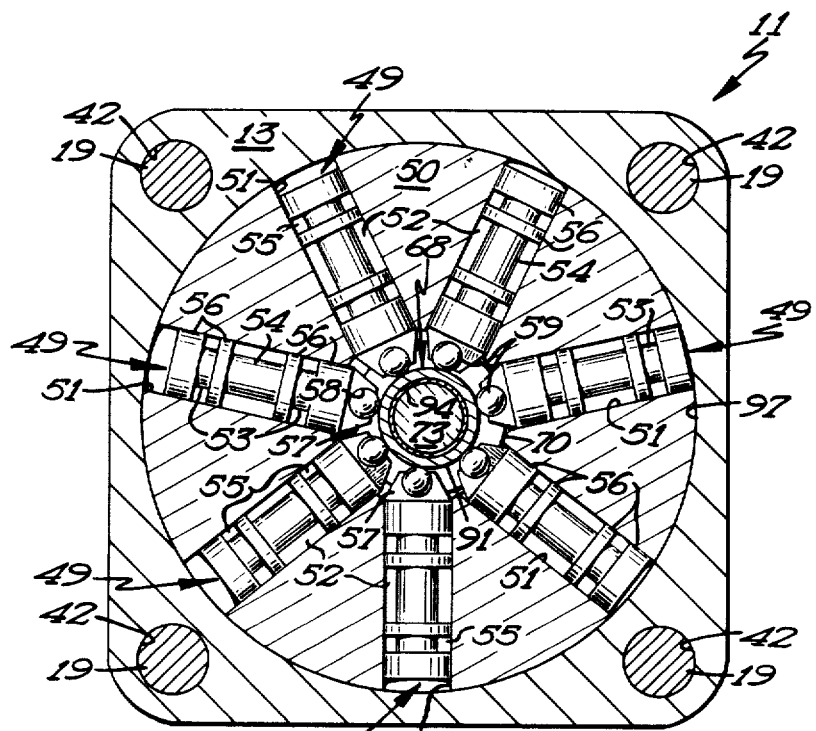
FIG. 3 is a sectional view of the Gerotor-type hydraulic motor taken on the line 3—3 of FIG. 1 showing the piston valves and their radial mounting in the piston valve cylinder block and the relationship between the piston valves and the camming means.

With reference to FIGS. 1 and 3, a series of piston valves 49 are radially disposed about the longitudinal axis of hydraulic motor 10 in a plane transverse thereto in piston valve cylinder block 50 in housing 11. Piston valves 49 are mounted in radial bores or cylinders 51 of cylinder block 50. Since piston valves 49 are generally cylindrical and have substantially the same diameter as radial bores or cylinders 51, they are capable only of axial movement within radial bores or cylinders 51 in the usual manner.

Each piston valve 49 is cut away at various locations along its length to define short neck portions 53 and long neck portions 54. Short neck portions 53 are provided merely to reduce the mass of piston valves 49. Thus, chambers 55 formed by short neck portions 53 and the wall of radial bores or cylinders 51 do not serve as fluid passage chambers but are, in fact, inactive. Long neck portions 54, on the other hand, define independent fluid passage chambers 52 which are the operable portion of piston valves 49. Discs 56, which remain after piston valves 49 have been cut away to define short neck portions 53 and long neck portions 54, are of substantially the same diameter as radial bores or cylinders 51. Thus, discs 56 serve to seal independent fluid passage chambers 52 from inactive chambers 55 and other portions of radial bores or cylinders 51. In addition, the hydraulic fluid utilized in operating hydraulic motor 10 acts as a lubricating fluid serving to facilitate axial movement of piston valves 49 within radial bores or cylinders 51 and, further, serving to seal independent fluid passage chambers 52. In the embodiment shown in FIG. 3, independent fluid passage chambers 52 serve the function of conducting fluid pressure to Gerotor chambers 23 during expansion thereof and exhausting the chambers during contraction thereof as will be more fully understood below.

Integrally formed in piston valves 49 are tabs 57 which lie in a plane transverse to the longitudinal axis of hydraulic motor 10. Tabs 57 are characterized by a planar, inwardly tapering surface having a maximum width substantially the same as the diameter of piston valves 49 and radial bores or cylinders 51 and a thickness substantially less than such diameter. In addition, tabs 57 have recessed portions 58 as one element of a means for transferring reciprocating movement to piston valves 49. In the specific embodiment disclosed herein, the means for transferring reciprocating movement also includes ball bearings 59. When ball bearings 59 are used, recessed portions 58 are generally circular and have diameters substantially the same as that of ball bearings 59 so that they can engage ball bearings 59. In addition, recessed portions 58 define an arc of greater than 180° to retain ball bearings 59 therein. By providing generally circular recessed portions 58 in this manner, ball bearings 59 are concentric therewith and are confined therein, as will be more fully understood below.

Figure 4:
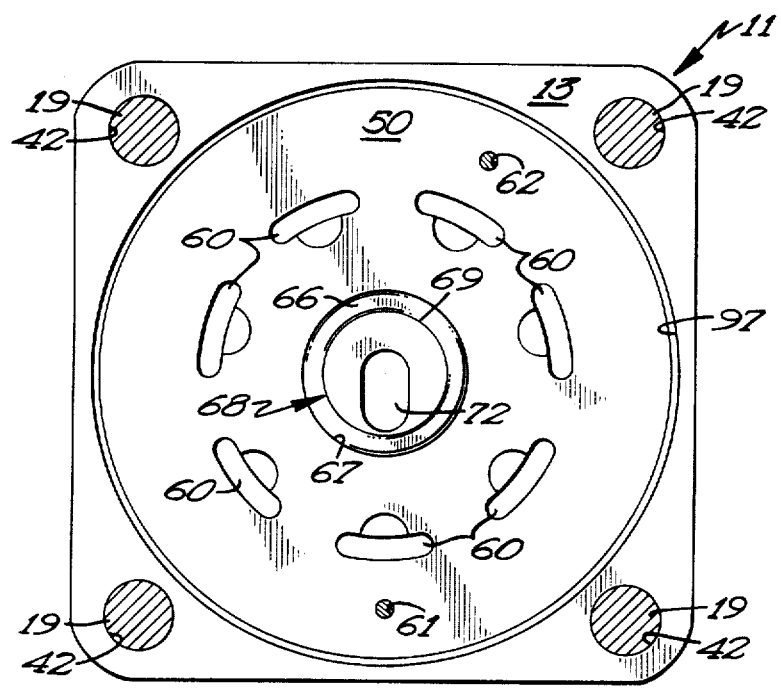
FIG. 4 is a sectional view of the Gerotor-type hydraulic motor taken on the line 4—4 of FIG. 1 showing a front view of the piston valve block.

The front surface of cylinder block 50, shown in FIG. 4, is disposed adjacent the rear surface of Gerotor unit 20 and is provided with a plurality of chamber apertures 60 which facilitate communication of fluid passage chambers 52 of piston valves 49 with Gerotor chambers 23, as will be understood by making reference to FIGS. 1, 2 and 3. Thus, fluid pressure can be conducted from fluid passage chambers 52 to Gerotor chambers 23 and exhausted from Gerotor chambers 23 to fluid passage chambers 52 by passing such fluid pressure through chamber apertures 60. The number of chamber apertures 60 provided is the same as the number of piston valves 49 and Gerotor chambers 23 utilized in hydraulic motor 10. In the preferred embodiment disclosed herein, seven chamber apertures are provided.

Holes 61 and 62 are provided in the front surface of cylinder block 50 so that when the hydraulic motor 10 is placed in a position for assembly such holes will align perfectly with holes 63 and 64, respectfully, provided in the rear surface of Gerotor unit 20 as shown in FIGS. 2 and 4. Then, pin 54, as shown in FIG. 1, is inserted in holes 61 and 63, and a similar pin, not shown, is inserted in holes 62 and 64 to hold the front surface of cylinder block 50 and the rear surface of Gerotor unit 20 in fixed relation during assembly and, thereafter, during operation.

Referring once again to FIG. 4, needle roller bearings 66 are circumferentially disposed about the cylindrical surface of central aperture 67. An axial section of needle roller bearings 66 can be seen in FIG. 1. Mounted in needle roller bearings 66 of central aperture 67 is eccentric circular camming means 68 as shown in FIGS. 1, 3 and 4. Camming means 68 and needle roller bearings 66 are mounted co-axially with hydraulic motor 10. In addition, camming means 68 includes bearing surface 69, camming surface 70, shaft 71 and actuating slot 72. Bearing surface 69 is in engagement with needle roller bearings 66 for rotational movement. Shaft 71 includes upper portion 73 and lower portion 74. Upper portion 73 passes through aperture 75 in camming surface 70, said upper portion 73 and said aperture 75 being of substantially the same diameter. Lower portion 74 of mounting shaft 71 is rotatably mounted in bushing or bearing 77 in end cap 76, said lower portion 74, upper portion 73 and bearing surface 69 being integral. End cap 76 and bushing or bearing 77 provided for lower portion 74 of shaft 71 can also be understood by making reference to FIG. 6. Finally, upper portion 73 of shaft 71 is characterized by an axis parallel to, but not co-axial with, the common axis of lower portion 74, bearing surface 69 and hydraulic motor 10. The eccentricity of upper portion 73 of shaft 71 defines the eccentricity of eccentric circular camming means 68. Thus, as camming means 68 is caused to rotate, upper portion 73 of shaft 71 causes camming surface 70 to orbit about the common axis of bearing surface 69, lower portion 74 of shaft 71, and hydraulic motor 10 in a plane transverse thereto.

The operation of eccentric circular camming means 68 in reciprocating piston valves 49 can best be understood by making reference to FIG. 1. More particularly, camming surface 70 of eccentric circular camming means 68 is comprised of race 78 provided to engage ball bearings 59. Race 78 is characterized by an annular groove provided to retain ball bearings 59 in rolling engagement therein. As previously discussed, the ball bearings 59 are concentric with circular recessed portion 58 of tabs 57 of piston valves 49 and are retained therein. Thus, piston valves 49 are directly responsive to movement of eccentric circular camming means 68 through ball bearings 59 which are confined within circular recessed portions 58 of tabs 57 and race 78 of camming surface 70. In this manner, means for transferring reciprocating movement to piston valves 49 is provided with the actual operation being more fully understood below.

Eccentric circular camming means 68 is caused to rotate as a result of the orbiting of extension 79 of short shaft 35. When rotor 22 of Gerotor unit 20 orbits, short shaft 35 is caused to orbit since arcuate external splines 37 thereof mesh with internal splines 38 of rotor 22. Thus, extension 79 of short shaft 35 is also caused to orbit. Since extension 79 of short shaft 35 is disposed in actuating slot 72 of eccentric circular camming means 68, extension 79 cranks camming means 68 about its axis. As a result, bearing surface 69 makes one rotation for each orbit of rotor 22. In addition, the axis of upper portion 73 of shaft 71 is caused to orbit about the common axis of lower portion 74, bearing surface 69 and hydraulic motor 10. This, in turn, causes camming surface 70 to orbit. The orbiting movement of camming surface 70 transfers reciprocating movement to piston valves 49 through ball bearings 59 engaged by and retained within race 78 of camming surface 70 and tabs 57 of piston valves 49. However, it should be noted that rotation of rotor 22 imparts no movement to eccentric circular camming means 68.

The general operation of piston valves 49 is substantially the same as shown and described in Bolduc U.S. Pat. No. 3,558,345. Fluid pressure is directed from fluid passage chambers 52 of piston valves 49 to chambers 23 of Gerotor unit 20 and from Gerotor chambers 23 to fluid passage chambers 52, through chamber apertures 60, as previously discussed and as shown in FIGS. 1 and 2. Piston valves 49 are sequentially reciprocated to direct fluid pressure to expanding Gerotor chambers 23 and exhaust fluid pressure from contracting Gerotor chambers 23 in the conventional manner. By directing fluid pressure to and exhausting fluid pressure from Gerotor chambers 23, rotor 22 is caused to rotate and orbit within stator 21. The orbiting movement of rotor 22 causes extension 79 of short shaft 35 to orbit. This, in turn, as previously discussed, causes eccentric circular camming means 68 to rotate and upper portion 73 of shaft 71 thereof to orbit, thereby transmitting reciprocating movement to piston valves 49. The sequential reciprocating movement transmitted to piston valves 49 provides the means whereby fluid pressure is directed to expanding Gerotor chambers 23 and exhausted from contracting Gerotor chamber 23.

As previously discussed, the rotation of rotor 22 within stator 21 is imparted by conducting fluid pressure to and exhausting fluid pressure from Gerotor chambers 23. The internal splines 28 of rotor 22 also impart rotational movement to short shaft 35 through external arcuate splines 37 thereof. The rotational movement of short shaft 35 is, in turn, transmitted to output shaft 27 by external arcuate splines 36 of short shaft 35 which are meshed with internal splines 33 of interior casing portion 30 thereof. It is therefore apparent that by merely directing fluid pressure to and exhausting fluid pressure from selected Gerotor chambers 23 in sequence, it is possible to transmit reciprocating movement to piston valves 49 and rotational movement to output shaft 27. Thus, by providing a selector valve 80, as shown in FIG. 1, to selectively and individually direct fluid pressure to and exhaust fluid pressure from various expanding and contracting Gerotor chambers 23 in various combinations, it is possible to provide a hydraulic motor capable of a multiplicity of modes of operation. The means for providing various modes of operation will be more fully described below.

The novel aspect of the present invention resides in providing a rear housing block 13 having a plurality of fluid passages for selectively and individually conducting fluid pressure to expanding Gerotor chambers 23 and exhausting fluid pressure from contracting Gerotor chambers 23 in sequence and a detailed understanding of the elements related to the fluid pressure and exhaust passages and the elements related thereto may be obtained with reference to FIGS. 1 and 4–8. With reference first to FIG. 1, rear housing block 13 is provided with an exhaust passage comprised of exhaust bore 18 and annular groove 81. Exhaust bore 18 extends from the exterior surface of housing 11 in rear housing block 13 and communicates with annular groove 81. As will be more fully understood below, annular groove 81 receives fluid exhausted from Gerotor chambers 23 by means of fluid passage chambers 52 of piston valves 49 and such fluid is then exhausted from hydraulic motor 10 through exhaust bore 18. Still making reference to FIG. 1, seals 82 and 83 are provided which are concentric with annular groove 81 and have diameters substantially the same as the outer and the inner diameters of annular groove 81, respectively. Seals 82 and 83 are disposed in annular recesses provided in piston valve block 50 and serve to minimize leakage of the fluid being exhausted from Gerotor chambers 23 through exhaust ports 84 in piston valve block 50 to annular groove 81 in rear housing block 13. In this manner, substantially all of the fluid within Gerotor chambers 23 can be exhausted from hydraulic motor 10 through exhaust bore 18 in the desired manner.

FIG. 1 also discloses pressure bores 17 which extend from the exterior surface of housing 11 in rear housing block 13 and communicate with pressure ports 85 in piston valve block 50. In addition, each pressure port 85 has seal 86 provided about the perimeter thereof. Seals 86 are disposed in elliptical recesses provided in the openings of pressure ports 85 and serve to minimize leakage of the fluid being conducted to Gerotor chambers 23. Finally, with reference to FIGS. 1 and 5, the rear surface of piston valve block 50 has a beveled edge in which seal 88 seats when piston valve block 50 is in an assembled position.

Figure 5:
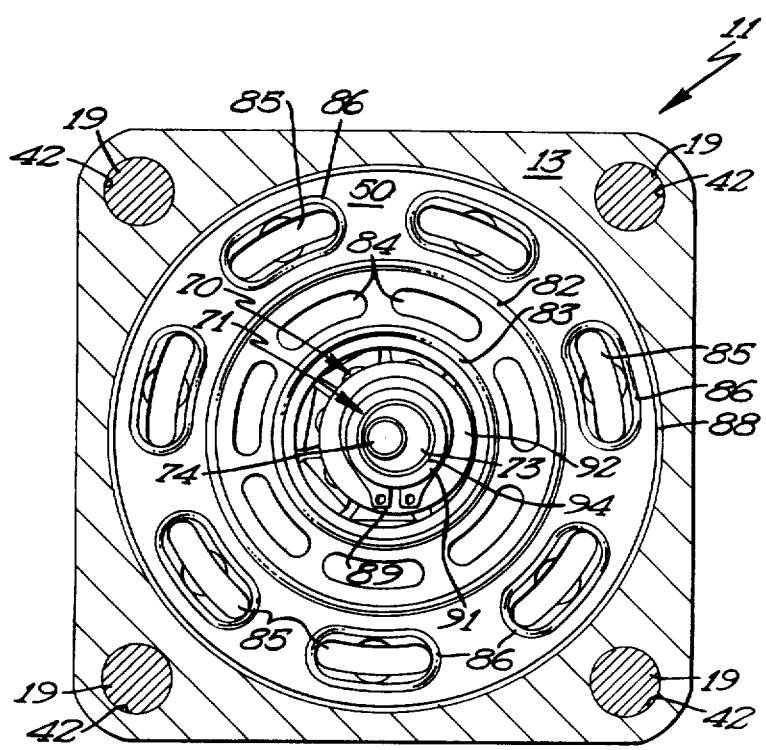
FIG. 5 is a sectional view of the Gerotor-type hydraulic motor taken on the line 5—5 of FIG. 1 showing a rear view of the piston valve block.

Making reference to FIG. 5, retaining ring 89 is provided to retain camming surface 70 in proper position on shaft 71 to engage and retain ball bearings 59 in a manner permitting eccentric circular camming means 68 to transmit reciprocating motion to piston valves 49. Retaining ring 89 engages annular groove 90 of upper segment 91 of camming surface 70, as shown in FIG. 1. In addition, upper segment 91 extends through an aperture in lower segment 92 of camming surface 70 to retain said lower segment 92 in engagement with shoulder 93 of said upper segment 91. Also, bushing 94 is provided in upper segment 91 through which upper portion 73 of shaft 71 extends.

Figure 6:
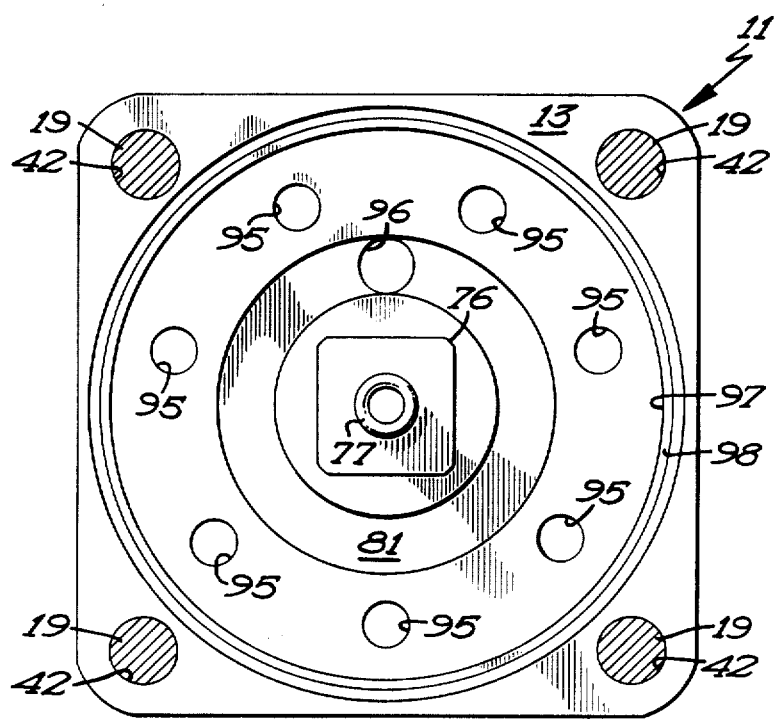
FIG. 6 is a front view of the rear housing block of the Gerotor-type hydraulic motor with the piston valve block removed.
Figure 7:
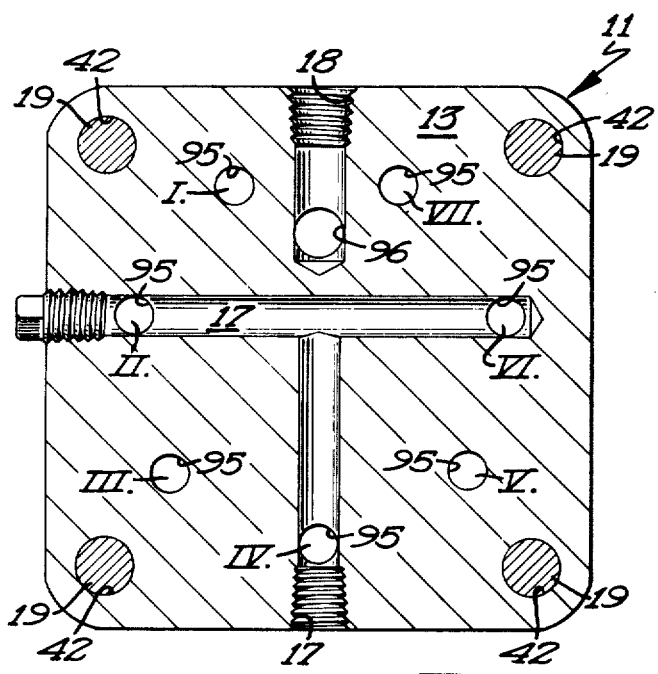
FIG. 7 is a sectional view of the Gerotor-type hydraulic motor taken on the line 7—7 of FIG. 1 showing the rear housing block in the plane of the exhaust bore.
Figure 8:
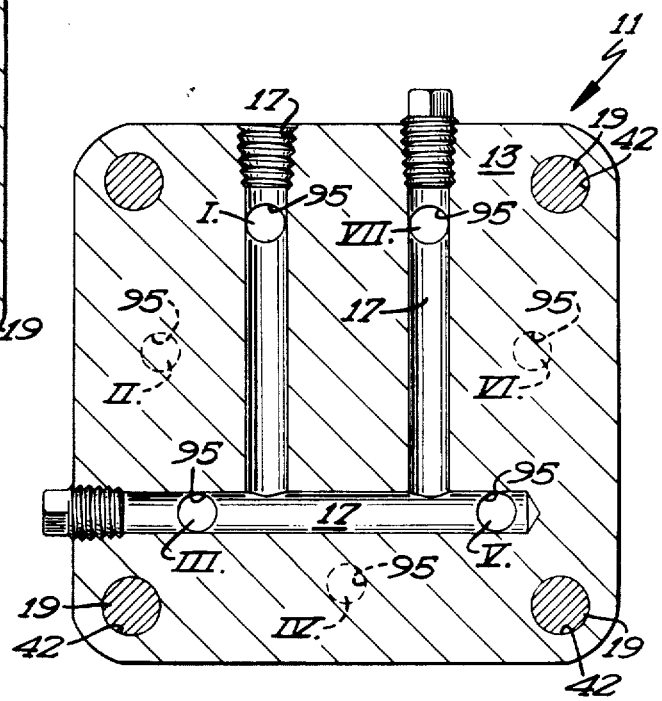
FIG. 8 is a sectional view of the Gerotor-type hydraulic motor taken on the line 8—8 of FIG. 1 showing the rear housing block in the plane of the pressure bore.

Referring to FIGS. 6–8, pressure bores 17 and exhaust bore 18 can be fully seen and understood. With reference first to FIG. 6, individual pressure cross bores 95 and exhaust cross bore 96 can be seen. Also, annular groove 81 is shown. As FIG. 6 reveals, annular groove 81 communicates directly with exhaust cross bore 96. Exhaust cross bore 96, in turn, communicates directly with exhaust bore 18, as shown in FIG. 7. Thus, as can readily be understood, annular groove 81 exhausts all of exhaust ports 84 without selectivity. Referring once again to FIG. 6, cavity 97 is provided in rear housing block 13 and is of suitable design and dimension to receive and mate with piston valve block 50 when hydraulic motor 10 is fully assembled. Cavity 97 has shoulder 98 provided to engage shoulder 99 of piston valve block 50. In addition, cavity 97 is characterized by a bevel edge adjacent the surface of rear housing block 13 thereof.

Referring now to FIGS. 7 and 8, pressure bores 17 can be fully seen and understood. More particularly, pressure bores 17 are provided, in the preferred embodiment, in two distinct sets. The first set, shown in FIG. 7, engages pressure cross bores 95 numbered II, IV and VI. The second set of pressure bores 17 engage pressure cross bores 95 numbered I, III, V and VII. Also, pressure bores 17 and exhaust bore 18 are threaded to receive external fluid lines and/or plugs. More particularly, since a single exhaust bore 18 is provided, the threads therein adjacent the opening in the external surface of housing 11 are provided to receive an external exhaust fluid line. However, since there are a plurality of pressure bores 17, and since only one external fluid line is needed to communicate with each of the two sets of pressure bores 17, the threads in the remaining pressure bores 17 adjacent the openings in the external surface of housing 11 are provided with plugs to close off such remaining openings. Of course, such plugs can be removed to provide additional pressure lines, if that should prove desirable, or such plugs can be removed and replaced by pressure gauges to maintain an accurate reading of the input pressure of the fluid being conducted to the hydraulic motor 10 if desired.

Finally, it should be noted that in the preferred embodiment discussed herein the two distinct sets of pressure bores 17 are each provided in a manner permitting engagement with either cross bores 95 numbered II, IV and VI, or cross bores 95 numbered I, III, V and VII, or cross bores 95 numbered I, II, III, IV, V, VI and VII to provide various distinct modes of operation while at the same time balancing the hydraulic motor 10 during operation to the extent possible. As will be more fully noted below, pressure cross bores 95 communicate with pressure ports 85 which, in turn, communicate with expanding Gerotor chambers 23. When selectively and individually conducting fluid pressure to selected Gerotor chambers 23 in sequence, it is desirable to conduct such fluid pressure in a manner balancing the forces created thereby. This aids the operation of the hydraulic motor 10 and makes such operation as smooth as possible. If, for instance, fluid pressure was conducted to only one Gerotor chamber 23, the hydraulic motor 10 would experience unstable operating characteristics since the forces created by the introduction of such fluid pressure would be unbalanced. However, it is possible to conduct fluid pressure to two Gerotor chambers 23 of my hydraulic motor in a manner balancing the forces created thereby. By providing balanced operation in the manner disclosed herein, however, hydraulic motor 10 is far more efficient and the internal parts thereof have a much higher life. The smooth operation of hydraulic motor 10 provided by the preferred embodiment substantially reduces wear of the moving parts while at the same time providing a hydraulic motor capable of effectively and efficiently operating in a multiplicity of distinct modes of operation.

Focusing now on the selector valve 80, reference should be made to FIGS. 1, 9 and 10. Selector valve 80 is a directional and mode control valve for hydraulic motor 10. External fluid pressure and exhaust lines, and a fluid pressure source and exhaust reservoir, not shown in the drawings, are of types well-known in the art. Such elements are represented in the drawings graphically by boxed labelled pressure and exhaust and by lines extending therefrom to selector valve 80, pressure bores 17 and exhaust bore 18.

Selector valve 80 is characterized by housing 100. Within housing 100 is exhaust chamber 101 and exhaust port 102. In addition, pressure port 103 is provided which communicates with pressure chamber 104. Pressure chamber 104, in turn, communicates with first operating port 105 and second operating port 106. First operating port 105 is connected to an external fluid pressure line which is received by second set of pressure bores 17, as disclosed in FIG. 8. Cross bores 95 numbered I, III, V and VII which are in communication with second set of pressure bores 17 are, in turn, each in communication with a corresponding pressure port 85, piston valve 49, chamber aperture 60 and Gerotor chamber 23. Also, second operating port 106 is connected to an external fluid pressure line which is received by first set of pressure bores 17, as disclosed in FIG. 7. Cross bores 95 numbered II, IV and VI which are in communication with first set of pressure bores 17 are, in turn, each in communication with a corresponding pressure port 85, piston valve 49, chamber aperture 60 and Gerotor chamber 23. Finally, pressure chamber 104 is in communication with outlet chambers 107 and 108 to which fluid pressure is introduced through pressure port 103 and from which fluid pressure is directed to hydraulic motor 10 through operating ports 105 and 106, respectively.

Extending through housing 100 of selector valve 80 is selector valve spool 109 which is characterized by operating handle 110 and a plurality of separator discs and neck portions. More particularly, spool 109 is characterized by neck portions 111, 112 and 113, and separator discs 114, 115, 116 and 117. By slidably adjusting spool 109, the separator discs and neck portions can be placed in various positions to permit fluid pressure introduced to selector valve 80 through pressure port 103 to be directed through either first operating port 105 or through second operating port 106 or through both first and second operating ports 105 and 106, respectively. Accordingly, selector valve 80 provides means to either direct fluid pressure to three Gerotor chambers 23 or four Gerotor chambers 23 or seven Gerotor chambers 23, respectively, within hydraulic motor 10.

Selector valve 80 can be selectively set in any one of three possible positions in the preferred embodiment. Detent means for selecting and setting spool 109 in such positions within housing 100 is provided and comprises, in part, three annular grooves 118, 119 and 120 in separator disc 117. Detent means further comprises helical coil spring 121 adjustably secured within slot 124 provided in housing 100 of selector valve 80 by screw 123 which is secured to spring 121, and additionally, comprises selector valve ball 122. Screw 123 is adjusted so that selector valve ball 122 is normally disposed above the interior surface of housing 100 of selector valve 80.

Utilizing detent means, spool 109 of selector valve 80 can be selectively set in any one of three possible positions by sliding spool 109 axially within selector valve 80. As shown in FIG. 1, spool 109 is locked in a first position with selector valve 122 in engagement with annular groove 120. Spring 121 biases selector valve ball 122 against annular groove 120 to lock spool 109 in such first position, and the biasing force of spring 121 can be increased or decreased by adjusting screw 123. Selector valve 80 can be set in a second position by sliding spool 109 axially by means of operating handle 110 until selector valve ball 122 is in engagement with annular groove 119, as shown in FIG. 9. It will, of course, be understood that the force transmitted by annular groove 120 when spool 109 is subjected to an axial force will depress selector valve ball 122 and spring 121 until selector valve ball 122 is fully depressed within slot 124. Selector valve ball 122 will remain depressed within slot 124 until spool 109 has been moved axially to a position in which annular groove 119 is positioned immediately above slot 124. When spool 109 is so positioned, spring 121 will force selector valve ball 122 into annular groove 119 and will bias selector valve ball 122 against the surface thereof to lock spool 109 in such second position, as shown in FIG. 9. Similarly, selector valve 80 can be moved to a third position, as shown in FIG. 10. Thus, in the preferred embodiment, a selector valve 80 is provided which can be placed in any of three possible operating positions.

When spool 109 of selector valve 80 is set in a first position, as shown in FIG. 1, fluid pressure from the pressure source is introduced thereto through pressure port 103 into pressure chamber 104. When spool 109 is in such first position, separator discs 114, 115, 116 and 117 are all positioned so that pressure chamber 104 is in communication with outlet chambers 107 and 108 which are, in turn, in communication with first operating port 105 and second operating port 106, respectively. Therefore, when selector valve 80 is in such first position, the external fluid pressure lines running from operating ports 105 and 106 to both the first set and the second set of pressure bores 17 are utilized. Thus, all of the pressure cross bores 95 numbered I, II, III, IV, V, VI and VII are active in conducting fluid pressure to hydraulic motor 10. As a result, all of the reciprocating piston valves 49 conduct fluid pressure sequentially to all of the expanding Gerotor chambers 23 and exhaust fluid pressure sequentially from all of the contracting Gerotor chambers 23 to annular groove 81 and into exhaust bore 18. This first mode of operation of the multiple mode motor is a low-speed, high-torque mode of operation.

When spool 109 of selector valve 80 is set in a second position, as shown in FIG. 9, fluid pressure from the pressure source is introduced thereto through pressure port 103 into pressure chamber 104. In such second position, separator discs 114, 115, 116 and 117 are all positioned so that pressure chamber 104 is in communication only with outlet chamber 107 and first operating port 105 since outlet chamber 108 and second operating port 106 are blocked from communication therewith by separator disc 116. Therefore, when selector valve 80 is in such second position, the external fluid pressure line running from first operating port 105 to the second set of pressure bores 17 is utilized and pressure cross bores 95 numbered I, III, V and VII are active in conducting fluid pressure to hydraulic motor 10. As a result, reciprocating piston valves 49 corresponding to such cross bores 95 numbered I, III, V and VII conduct fluid pressure sequentially to expanding Gerotor chambers 23 corresponding thereto and exhaust fluid pressure sequentially from all of the contracting Gerotor chambers 23 to annular groove 81 and into exhaust bore 18. In addition, isolated Gerotor chambers 23 corresponding to pressure cross bores 95 numbered II, IV and VI which are not active in conducting fluid pressure to hydraulic motor 10 when selector valve 80 is in such second position are in constant communication with the exhaust reservoir. Pressure cross bores 95 numbered II, IV and VI communicate with the first set of pressure bores 17 which are, in turn, in communication with the external fluid pressure line extending therefrom. The external fluid pressure line is connected to second operating port 106 of selector valve 80. When selector valve 80 is in such second position, second operating port 106 and outlet chamber 108 are in communication with exhaust chamber 101 which, in turn, is in communication with exhaust port 102 leading to the exhaust reservoir through an external exhaust line connected thereto. Of course, any fluid which is exhausted from isolated Gerotor chambers 23 in this manner is blocked from communication with pressure chamber 104 and outlet chamber 107 by separator discs 116 and 117. Thus, fluid leakage to isolated Gerotor chambers 23 corresponding to pressure cross bores 95 numbered II, IV and VI is exhausted during expansion of such chambers into the exhaust reservoir. In this manner, all of the Gerotor chambers 23 are exhausted during contraction thereof and isolated Gerotor chambers 23 are exhausted during expansion thereof as well. Thus, when spool 109 of selector valve 80 is in such second position, an intermediate mode is provided for hydraulic motor 10. Fluid pressure is conducted sequentially to four expanding Gerotor chambers 23 with the remaining three chambers being isolated. This second mode of operation of the multiple mode motor is an intermediate speed and torque mode of operation.

When spool 109 of selector valve 80 is set in a third position, as shown in FIG. 10, fluid pressure from the pressure source is introduced thereto through pressure port 103 into pressure chamber 104. In such third position, separator discs 114, 115, 116 and 117 are all positioned so that pressure chamber 104 is in communication only with outlet chamber 108 and second operating port 106 since outlet chamber 107 and first operating port 105 are blocked from communication therewith by separator disc 116. Therefore, when selector valve 80 is in such third position, the external fluid pressure line running from second operating port 106 to the first set of pressure bores 17 is utilized and pressure cross bores 95 numbered II, IV and VI are active in conducting fluid pressure to hydraulic motor 10. As a result, reciprocating piston valves 49 corresponding to such cross bores 95 numbered II, IV and VI conduct fluid pressure sequentially to expanding Gerotor chambers 23 corresponding thereto and exhaust fluid pressure sequentially from all of the contracting Gerotor chambers 23 to annular groove 81 and into exhaust bore 18. In addition, isolated Gerotor chambers 23 corresponding to pressure cross bores 95 numbered I, III, V and VII which are not active in conducting fluid pressure to hydraulic motor 10 when selector valve 80 is in such third position are in constant communication with the exhaust reservoir. Pressure cross bores 95 numbered I, III, V and VII communicate with the second set of pressure bores 17 which are, in turn, in communication with the external fluid pressure line extending therefrom. The external fluid pressure line is connected to first operating port 105 of selector valve 80. When selector valve 80 is in such third position, first operating port 105 and outlet chamber 107 are in communication with exhaust chamber 101 which, in turn, is in communication with exhaust port 102 leading to the exhaust reservoir through an external exhaust line connected thereto. Of course, any fluid which is exhausted from isolated Gerotor chambers 23 in this manner is blocked from communication with pressure chamber 104 and outlet chamber 108 by separator discs 114 and 116. Thus, fluid leakage to isolated Gerotor chambers 23 corresponding to pressure cross bores 95 numbered I, III, V and VII is exhausted during expansion of such chambers into the exhaust reservoir. In this manner, all of the contracting Gerotor chambers 23 are exhausted during contraction thereof and isolated Gerotor chambers 23 are exhausted during expansion thereof as well. Thus, when spool 109 of selector valve 80 is in such third position, fluid pressure is conducted sequentially to three expanding Gerotor chambers 23 with the remaining four chambers being isolated. This third mode of operation of the multiple mode motor is a high-speed, low-torque mode of operation.

Another mode of operation contemplated by the preferred embodiment of the present invention is achieved by merely reversing the fluid flow in the exhaust line and the pressure lines of my invention to thereby reverse the rotational drive of the output shaft 27 of the hydraulic motor 10. When the fluid flow in the lines is reversed, a single additional mode is provided. The reason that only a single additional mode can be accomplished when the fluid flow is reversed is that the exhaust bore 18 communicates with a single exhaust cross bore 96 which, in turn, communicates with annular groove 81. Thus, by feeding fluid pressure through exhaust bore 18, exhaust cross bore 96, and finally, into annular groove 81 it is not possible to selectively direct fluid pressure to various piston valves 49 for valving into selected Gerotor chambers 23. Instead, fluid pressure is directed to all of the piston valves 49 and, in turn, is directed to all of the expanding Gerotor chambers 23. Thus, when the fluid flow of the multiple mode motor of the present invention is reversed, a low-speed, high-torque mode of operation is provided in such reversed direction. Accordingly, with the preferred embodiment of my invention, a multiple mode motor capable of operating in any of three distinct modes of operation in a first direction with means for nearly instantaneously shifting such motor from one mode of operation to another and a multiple mode motor capable of operating in one mode of operation in a second direction is provided.

However, it would be obvious to provide additional exhaust bores 18 in a manner imitating pressure bores 17. If this was done, when the fluid flow in the exhaust and the pressure lines was reversed, it would be possible to selectively direct fluid pressure to Gerotor chambers 23 in such reversed direction. Once such selectivity is provided in both directions, a reversible, multiple mode motor is provided. Thus, by providing additional exhaust bores 18 in a manner imitating pressure bores 17 it is possible to provide a multiple mode motor capable of being reversed in direction and capable of being shifted nearly instantaneously to any of three distinct modes of operation in either direction.

Finally, although the preferred embodiment of the multiple mode motor disclosed herein provides three distinct modes of operation, it would also be obvious to provide a Gerotor unit having a higher number of Gerotor chambers and a correspondingly higher number of pressure cross bores 95, pressure ports 85, piston valves 49, fluid passage chambers 52 and chamber apertures 60 to register therewith. By providing a Gerotor unit having a higher number of Gerotor chambers and a correspondingly higher number of the elements communicating therewith, it is possible to provide additional pressure bores in the rear housing block to direct fluid pressure to various combinations of Gerotor chambers. This makes it possible to provide additional modes of operation including modes having peak operating characteristics exceeding the low-speed, high-torque and high-speed, low-torque operating characteristics possible with the embodiment disclosed herein. It would also be obvious that by providing a Gerotor unit having a higher number of Gerotor chambers than the embodiment disclosed herein, it is possible to provide a hydraulic motor capable of operation in more than one intermediate mode of operation. The number of such intermediate modes of operation will only be limited by the maximum and minimum number of chambers and combinations thereof, which can be utilized. Of course, the maximum number of chambers which can be utilized will always be the total number of chambers in any particular Gerotor unit. However, the minimum number of chambers which can be utilized will ultimately depend upon the minimum number of such chambers necessary to facilitate smooth operation of the hydraulic motor. It will be understood, of course, that the concept of providing a multiple mode motor is also limited by design requirements since only a limited number of pressure bores can be provided in the rear housing block while at the same time keeping such rear housing block within reasonable dimensions.

With use of the present invention, a highly useful and versatile hydraulic motor characterized by a plurality of modes of operation which vary in speed and torque depending upon the relative number of active and passive Gerotor chambers is provided. By utilizing means for shifting the motor from one mode of operation to another by selectively activating certain chambers and isolating the balance in various combinations, a hydraulic motor capable of a wide range of applications is disclosed. Other advantages of the present invention include providing a hydraulic motor capable of driving heavy loads by shifting the motor to a low-speed, high-torque mode of operation. Also, a hydraulic motor capable of driving lighter loads at a high speed is provided by shifting the motor to a high-speed, low-torque mode of operation. Finally, a highly useful and versatile hydraulic motor capable of driving intermediate loads at intermediate speed and torque is provided by shifting the motor to various modes of operation having such characteristics.

While I have shown a specific embodiment of the apparatus and method for a multiple mode motor for purposes of illustration only, it is to be understood that the invention is to be limited solely by the scope of the appended claims.

I claim as my invention:

1. In a fluid motor, of the type which accepts fluid from a pressure source, converts the fluid energy into mechanical energy and then exhausts the fluid, having:
   a Gerotor unit capable of relative rotational and orbital movement to define a plurality of expanding and contracting chambers;
   a like plurality of pressure ports, wherein each said pressure port is associated with a single chamber;
   a like plurality of exhaust ports, wherein each said exhaust port is associated with a single chamber and is in communication with exhaust; and
   valve means for placing said pressure ports in communication with their respective associated chambers when said associated chambers are expanding and for placing said exhaust ports in communication with their respective associated chambers when said associated chambers are contracting;
   the improvement comprising:
   selector means for selectively connecting predetermined ones of said pressure ports to the pressure source or to exhaust.

2. The fluid motor recited in claim 1 wherein said valve means comprises a like plurality of piston valves and means responsive to the relative movement of said Gerotor unit for reciprocating said pistons.

3. The fluid motor recited in claim 1 wherein:
   said Gerotor unit is mounted within a housing;
   said housing includes at least two independent fluid pressure bores, each of said bores being in communication with selected ones of said pressure ports, and an exhaust bore in communication with said exhaust ports; and
   said fluid pressure bores are in communication with said selector means for selectively connecting said fluid pressure bores to the pressure source or to exhaust.

4. The fluid motor recited in claim 3 wherein:
said plurality is seven; and
the first said independent fluid pressure bore is in communication with a first set of three of said pressure ports and the second said independent fluid pressure bore is in communication with a second set of four of said pressure ports.

5. The fluid motor recited in claim 4 wherein the pressure ports comprising said first and second sets are substantially balanced about the longitudinal axis of the motor.

6. The fluid motor recited in claim 5 wherein said selector means comprises a spool valve having a first position for connecting both of said independent fluid pressure bores to a pressure source, a second position for connecting the first independent fluid pressure bore to exhaust and the second to the pressure source and a third position for connecting the second independent fluid pressure bore to exhaust and the first to the pressure source.

7. A method for shifting the mode of operation of a fluid motor, of the type which accepts fluid from a pressure source, converts the fluid energy to mechanical energy and then exhausts the fluid, having a Gerotor unit capable of relative rotational and orbital movement to define a plurality of expanding and contracting chambers, a like plurality of pressure ports wherein each said pressure port is associated with a single chamber, a like plurality of exhaust ports wherein each said exhaust port is associated with a single chamber and is in communication with exhaust, and valve means for placing said pressure ports in communication with their respective associated chambers when said associated chambers are expanding and for placing said exhaust ports in communication with their respective associated chambers when said associated chambers are contracting, which method comprises the steps of:
selectively connecting predetermined ones of said pressure ports to the pressure source; and
connecting the remaining pressure ports to exhaust.

8. The method of claim 7 wherein the step of selectively connecting predetermined ones of said pressure ports to the pressure source includes varying said predetermined member from all of said pressure ports to three of said pressure ports.

9. The method of claim 8 wherein said predetermined ones of said pressure ports are substantially balanced about the longitudinal axis of the motor.

* * * * *